(12) United States Patent
Suzuki et al.

(10) Patent No.: US 6,310,674 B1
(45) Date of Patent: *Oct. 30, 2001

(54) METHOD OF MAKING A DISPLAY DEVICE WITH ELECTRODE CHARACTERISTICS

(75) Inventors: Yoshiaki Suzuki, Yokohama; Yuichi Masaki, Kawasaki; Keishi Danjo, Isehara, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,897

(22) Filed: Dec. 27, 1996

(30) Foreign Application Priority Data

Dec. 27, 1995 (JP) .................................. 7-353474
Dec. 28, 1995 (JP) .................................. 7-344057

(51) Int. Cl.⁷ .................. G02F 1/1335; G02F 1/1333; G02F 1/13
(52) U.S. Cl. ................ 349/139; 349/187; 349/106; 349/138
(58) Field of Search ...................... 349/139, 106, 349/171, 187, 138; 399/106, 139, 171, 187, 138

(56) References Cited

U.S. PATENT DOCUMENTS

| 4,796,980 | 1/1989 | Kaneko et al. ............. 350/350 S |
| 5,076,671 | 12/1991 | Uchimi et al. .................. 359/56 |
| 5,105,291 | * 4/1992 | Matsumoto et al. ............. 349/139 |
| 5,177,627 | 1/1993 | Ishiwata et al. ................ 359/68 |
| 5,296,096 | 3/1994 | Enomoto et al. ............... 156/667 |
| 5,327,272 | * 7/1994 | Fujiwara et al. ............... 349/139 |
| 5,340,491 | 8/1994 | Enomoto et al. ............... 252/79.1 |
| 5,381,256 | 1/1995 | Hanyu et al. .................... 359/75 |
| 5,467,209 | 11/1995 | Hotta et al. ...................... 359/74 |
| 5,589,964 | 12/1996 | Hotta et al. .................... 349/160 |
| 5,708,486 | * 1/1998 | Miyawaki et al. ................ 349/44 |

FOREIGN PATENT DOCUMENTS

| 253 512 | 12/1988 | (DE) . |
| 403 936 | 12/1990 | (EP) . |
| 63-184726 | 7/1988 | (JP) . |
| 5-151827 | 6/1993 | (JP) . |

OTHER PUBLICATIONS

Patent Abstracts of Japan, vol. 14, No. 585 (P–1148) & JP 02 251990 A (Ricoh).
Patent Abstracts of Japan, vol. 11, No. 283 (P–615) & JP 62 079421 A (Seiko).
Patent Abstracts of Japan, vol. 95, No. 4 & JP 07 028073 A (Canon).
Patent Abstracts of Japan, vol. 12, No. 463 (P–796) & JP 63 184726 A (Hitachi).

* cited by examiner

Primary Examiner—William L. Sikes
Assistant Examiner—Toan Ton

(57) ABSTRACT

A display device is constituted by a pair of substrates at least one of which is provided with a display electrode. The display electrode comprises an electroconductive transparent film comprising indium oxide and/or tin oxide and having a surface unevenness of at most 30 Å. The transparent film may preferably be an ITO film containing an amorphous component. The transparent film is effective in improving a surface flatness allowing a good alignment control performance while retaining a good transmittance and a low sheet resistance and is readily etched with weak acid to suppress peeling of an underlying layer thereof and an occurrence of microcracks therein.

12 Claims, 12 Drawing Sheets

1μm

1μm

1μm

METHOD OF MAKING A DISPLAY DEVICE WITH ELECTRODE CHARACTERISTICS

FIELD OF THE INVENTION AND RELATED ART

The present invention relates to display device of various types including self-light emission type and non-self-light emission type, particularly a liquid crystal display device employing a liquid crystal as a display medium, and a process for producing the display device.

Heretofore, there has been generally used an electroconductive transparent film as a transparent electrode functioning as a display electrode of a display device, particularly a liquid crystal display device of a twisted nematic (TN)-type or a super twisted nematic (STN)-type, in view of several properties, such as a light transmittance, an electrical resistance and a mechanical strength.

As the electroconductive transparent film, a thin film of metal oxide, such as tin oxide or indium oxide, preferably indium oxide doped with tin (hereinbelow referred to as "indium-tin oxide (ITO)") has been utilized.

Such an electroconductive transparent film, particularly an ITO film, has been known that has a high crystallinity and shows main peaks with respect to its crystal planes (Miller indices) (2, 2, 2) and (4, 0, 0) in X-ray diffractometry. The electroconductive transparent film is required to have a low sheet resistance and a high transparency as described above, thus resulting in a film produced by restricted processes and conditions. For this reason, there has been used a film having a high crystallinity (high-crystalline film) as the electroconductive transparent film. For example, in Japanese Laid-Open Patent Application (JP-A) 5-151827 (151827/1993), there has been proposed the use of a film of ITO having a large crystal particle size (at least 400 Å in <222> direction) from a viewpoint of surface roughening in order to improve its adhesiveness to a metal film disposed thereon.

However, such a high-crystalline transparent film (ITO film) has been accompanied with the following problems.

The high-crystalline transparent film has a large surface roughness, thus failing to provide a flat surface characteristic required for a display electrode. If the high-crystalline transparent film is used as a display electrode, the resultant display characteristic is insufficient. For instance, in where the high-crystalline transparent film has been used as a transparent electrode of a liquid crystal display device having a cell structure including a liquid crystal sandwiched between a pair of electrodes, an uneven surface of the transparent electrode has adversely affected some properties of the display device, such as an alignment control characteristic, particularly the property of providing uniform alignment state, to liquid crystal molecules.

More specifically, in the case of forming a ca. 100 nm-thick ITO film, when a high-crystalline ITO material is used, the resultant ITO film generally has a surface unevenness (surface roughness) of ca. 10–20 nm (100–200 Å) as a peak-to-peak (valley) value (i.e., a maximum difference in height) measured by using a scanning tunnel microscope (STM) although the resultant surface unevenness varies depending on film-forming processes and conditions. In case where such an ITO film is used as a display (transparent) electrode of the above-mentioned liquid crystal display device, an upper alignment control film (a film having an alignment control ability with respect to liquid crystal molecules) fails to exhibit a uniform property due to the above-mentioned uneven-surfaced ITO film, thus resulting in a film incapable of controlling an alignment state of the liquid crystal molecules uniformly in some cases. This problem is more noticeable when using a thinner alignment control film or when using a polymeric material for an alignment control film which has a high polymerization degree or a high rigidity which may not to readily produce a thin film formation.

Further, in case where, e.g., an organic film is formed on the above-mentioned uneven-surfaced ITO film and subjected to rubbing treatment to prepare an alignment control film, the resultant alignment control film causes not only an occurrence of film breakage but also failure of uniform rubbing in terms of micron-level rubbing over the entire surface of the alignment control film. Accordingly, such an alignment control film is liable to have ununiform properties and cause alignment defects or alignment irregularity of liquid crystal molecules.

Further, in the liquid crystal display device, at least one species of an insulating film for, e.g., preventing short circuit between oppositely disposed substrates is formed on an ITO film as a display electrode. In this case, if the high-crystalline ITO film is used, the insulating film has a nonuniform insulating performance due to surface unevenness of the ITO film, thus adversely affecting improvement in characteristics of the display device in some cases.

When the above-described ITO film is used as a display (transparent) electrode of a display device, the ITO film is generally patterned in a prescribed shape in accordance with, e.g., a pixel shape used.

In order to perform patterning of the ITO film, there has been generally practiced an etching treatment according to a photolithographic process after forming the ITO film by using, e.g., sputtering or vapor deposition. In this etching treatment, there have been generally used strong acids, such as hydrochloric acid-ferric chloride mixture liquid, hydrobromic acid and hydroiodic acid, as an etchant (etching liquid). Further, in order to prevent ununiform etching, an etchant comprising hydroiodic acid mixed with ferric chloride has been used. This etchant also falls under the category of strong acids.

In the etching treatment for providing a desired pattern to a transparent electrode by patterning of the ITO film, it is necessary to pay attention to an influence of the ITO film etching (patterning) on underlying layers. In this regard, e.g., in a production process of a color liquid crystal display device wherein a liquid crystal is disposed between a pair of glass substrates at least one of which is provided with a resinous color filter film and a resinous flattening (coating) layer disposed thereon, when a transparent electrode (ITO film) pattern is formed on the glass substrate having thereon the resinous layers (color filter film and the flattening layer) in the above-mentioned manner (etching with the strong acid-type etchant), chlorine ion and bromine ion contained in the etchant readily penetrate through the resinous layers to reach the surface of the glass substrate and form a salt with sodium (Na) ion thereat.

The above-mentioned strong acid-type etchant including hydrochloric acid-ferric chloride mixture liquid (pH=−1.52 to −1.22), hydrobromic acid (pH=1.58 to −1.28), hydroiodic acid (pH=−1.58 to −1.28 at 57 wt. % solution) and hydroiodic acid-ferric chloride (pH=−1.39 to −1.09) reacted with a small amount of a metal component contained in the flattening layer to cause an occurrence of a peeling portion 32 and/or microcracks 33 with respect to a flattening layer 31 as shown in FIG. 15 illustrating a schematic sectional view of a substrate provided with a color filter. Referring to FIG. 15, on a glass substrate 34, a metal light-interrupting layer (called "black matrix") 35 and a color filter layer (film) 30 are formed. On these layers 35 and 30, the flattening layer 31 and a transparent electrode (ITO film) 36 are successively formed. In this type of a liquid crystal display device, patterning of the transparent electrode 36 is performed so as to correspond to a pattern of the color filter layer 30 to constitute display pixels.

Herein, each of the pH values of the above etchants is obtained as a value by subtracting 2 from a reference pH value measured by means of a pH meter by using an aqueous solution of a sample etchant (sample etchant:water=1:100 by weight) prepared by diluting the etchant with water.

As described above, under the influence of the etching treatment with the strong acid-type etchant for patterning of the transparent (ITO) electrode 36, the flattening layer 31 is liable to cause a lowering in adhesive strength and a peeling phenomenon in a wider region due to heating in subsequent steps, thus resulting in a defective flattening layer.

SUMMARY OF THE INVENTION

An object of the present invention is to provide a display device, particularly a liquid crystal device, excellent in display characteristics by employing as a display electrode an electroconductive transparent film ensuring a low (electrical) resistance and a high (light) transmittance stably and having an excellent even (flat) surface characteristic (surface smoothness) and rich in processability.

Another object of the present invention is to provide a process for producing the above display device using an electroconductive transparent film exhibiting excellent properties by performing patterning of the transparent film with a weak acid-type etchant so as not to adversely affect underlying layers while ensuring a good patterning accuracy.

According to the present invention, there is provided a display device, comprising:

a pair of substrates at least one of which is provided with a display electrode, wherein said display electrode comprises an electroconductive transparent film comprising indium oxide and/or tin oxide and having a surface unevenness of at most 30 Å with repect to a horizontal length of 200–500 Å.

According to the present invention, there is also provided a process for producing a display device comprising a pair of substrates at least one of which is provided with a display electrode, comprising the steps of:

forming a film comprising indium oxide and/or tin oxide containing an amorphous component on at least one of the substrates, and providing at least one of said display electrodes with a pattern through a photolithographic process including an etching treatment with a weak acid-type etchant.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
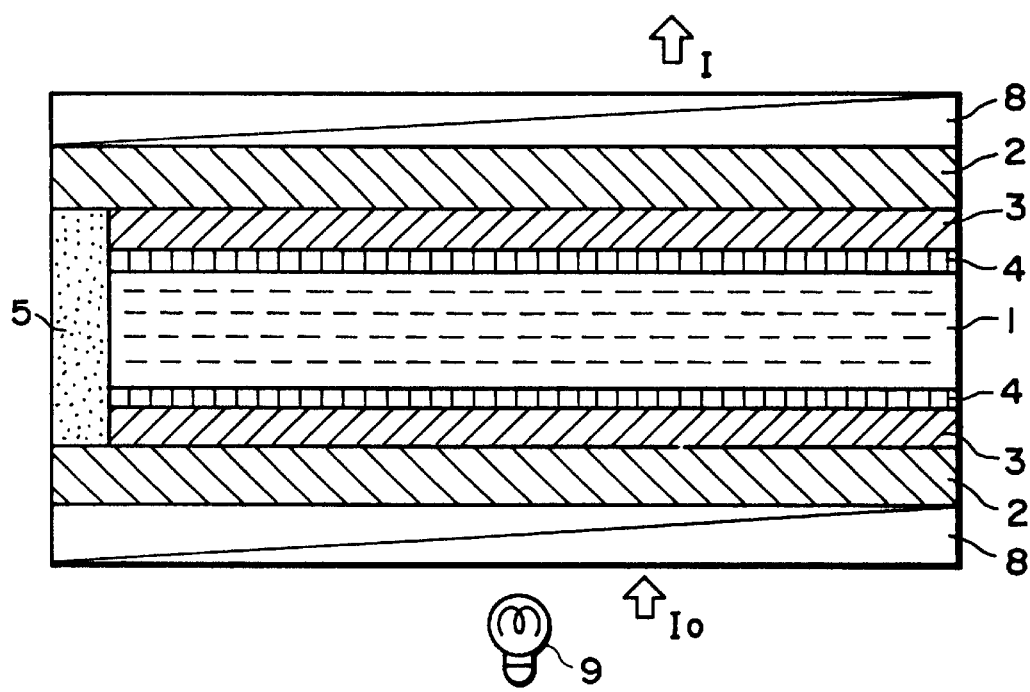
FIG. 1 is a schematic sectional view of a liquid crystal device as an embodiment of a display device according to the present invention.

The display device according to the present invention is characterized by using an electroconductive transparent film (hereinbelow, simply referred to as "transparent film") having a surface unevenness of at most 30 Å, thus remarkably improving its surface smoothness.

Herein, the term "surface unevenness" means a maximum difference in height (or a difference in height between the highest point and the lowest point) with respect to a horizontal length of 200–500 Å (reference length) as measured though an atomic force microscope (AFM) and a scanning tunnel microscope (STM).

In the present invention, in order to obviate an uneven surface due to a crystal of a large particle size, a transparent film may be prepared by forming a thin film of a material comprising indium oxide and/or tin oxide, preferably ITO, containing an amorphous component to improve a surface smoothness and provide a decreased surface unevenness (at most 30 Å due to a small particle size at the surface of a resultant film) followed by annealing of the film under suitable conditions (e.g., a temperature of 180° C. or below). The thus prepared transparent film shows a transmittance and a sheet resistance at an acceptable level even when compared with a conventional ITO film having a high crystallinity, and also is excellent in surface flatness, thus sufficiently contributing to an improvement in characteristics of a display device as a display electrode. In addition, the transparent film retains therein an amorphous component after film formation and accordingly allows a variety of etchants inclusive of weak acids in an etching step during a pattern formation in contrast with the conventional high-crystalline ITO film. As a result, damage to underlying layers of the transparent film can be alleviated to enhance performances of a resultant display device provided with the transparent film as a display electrode.

In the present invention, the transparent film comprising indium oxide and/or tin oxide, particularly ITO film, can be formed by using various film-forming processes and conditions. For example, in a sputtering film-forming process, an ITO film having a high amorphous degree can be obtained by setting a low power density condition and a low substrate temperature (preferably 100° C. or below). At this time, by setting an amount of oxygen gas so as to become smaller than a theoretical amount for an ordinary (high-crystalline) ITO film, it is possible to promote an increase of an amorphous component to provide an ITO film surface in fine-particle shape, thus resulting in an excellent surface flatness (e.g., surface unevenness of at most 30 Å).

The thus prepared transparent film containing the amorphous component can be accompanied with difficulties, such as a lowered transmittance and a high sheet resistance in some cases.

Accordingly, in the present invention, film-forming conditions for the transparent film containing an amorphous component and an anneal-treating condition, particularly temperature, may preferably be set at low temperature, e.g., at 150–300° C., more preferably at most 200° C., further preferably at most 180° C., thus retaining a transmittance and a sheet resistance of a resultant film at a practically acceptable level comparable to that of the high-crystalline ITO film. Further, it is possible to indirectly effect annealing of the transparent film (particularly ITO film) containing an amorphous component by heating (or curing) in subsequent steps (e.g., of forming an insulating film or an alignment film). At this time, the temperature of heating may preferably at most 280° C., more preferably at most 250° C.

In such a case, the annealing treatment may preferably be performed after the transparent (ITO) film containing the amorphous component is subjected to patterning by using an etchant, e.g., weak acid, less affecting the lower layers disposed thereunder, in view of realization of an accuracy of patterning and optical and electrical characteristics of the transparent film at the same time.

Incidentally, JP-A 5-151827 described above discloses an amorphous state of ITO and a heat treatment (annealing) thereof. A resultant ITO film is formed in order to improve an adhesiveness to a metal film by providing the surface of the ITO film with an unevenness and has a crystal particle size of at least 400 Å as measured according to X-ray diffraction analysis.

However, according to our study, a surface unevenness of the ITO film after the annealing is not concerned with the particle size based on X-ray diffraction. The ITO film after the annealing used in the present invention has a decreased surface unevenness (at most 30 Å), thus being excellent in flatness when compared with the surface-roughened ITO film of JP-A 5-151827.

The above-described display device using the transparent film as a display electrode according to the present invention is applicable to many display devices of non-light emission type, such as liquid crystal displays and of light emission type, such as electroluminescence display (ELD) and plasma display panel (PDP). In any type of the display device, the transparent film used therein is excellent in surface smoothness while retaining a high transmittance and a low resistance, thus remarkably improving a display performance.

The display device of the present invention may preferably be used as a liquid crystal (display) device wherein a liquid crystal is sandwiched between a pair of substrates provided with display electrodes and an alignment state of the liquid crystal is controlled by applying a prescribed voltage to the liquid crystal thereby to form a desired display image. More specifically, in such a liquid crystal device, an alignment state of liquid crystal molecules at each pixel is controlled to regulate a light transmittance in accordance with a two-valued scheme or a multi-valued scheme, thus obtaining a desired image. In this case, an addressing scheme of pixels may be a multiplexing-addressed scheme using an electrode matrix or a light-addressed scheme using a photoconductive film.

The liquid crystal used in the present invention may be a nematic liquid crystal or a smectic liquid crystal, preferably a liquid crystal assuming a chiral smectic phase and ferroelectricity in view of facility of alignment control. In the case of using a chiral smectic (ferroelectric) liquid crystal as a liquid crystal of the display device of the present invention, a uniformity of properties of an alignment control film is effectively improved due to a good performance, particularly an improved surface flatness of a transparent film (transparent electrode).

The display device of the present invention may be used as a liquid crystal device of an active matrix-type using a nematic liquid crystal wherein each pixel is provided with a switching element (e.g., a thin film transistor (TFT) or a metal insulator metal (MIM)).

Hereinbelow, a preferred embodiment of the display device of the present invention used as a a liquid crystal device will be specifically described with reference to FIG. 1.

FIG. 1 is a schematic sectional view of an embodiment of the liquid crystal device including a liquid crystal layer for explanation of the structure thereof.

Referring to FIG. 1, the liquid crystal device includes a liquid crystal layer 1 disposed between a pair of substrates 2 (e.g., glass substrates) each having thereon a transparent electrode 3 and an alignment control layer 4. The substrates 2 are placed or arranged opposite to each other. Outside the substrates 2 a pair of polarizers 8 are disposed so as to modulate incident light $I_0$ from a light source 9 in cooperation with the liquid crystal 1 to provide modulated light I.

Each of two glass substrate 2 is coated with a transparent electrode 3 comprising a film, a material comprising indium oxide and/or tin oxide, preferably an ITO film, via at least one layer, as desired, to form an electrode plate. The transparent electrode is subjected to patterning so as to provide a prescribed shape corresponding to a pixel shape. Further thereon, an alignment control layer 4 having an aligning state control ability of liquid crystal molecules is formed. At least one of the alignment control layers 4 may preferably be formed by rubbing a film of a polymer such as polyimide with gauze or acetate fiber-planted cloth so as to uniaixally aligning the liquid crystal molecules in one direction. Examples of a material for the alignment control layer may include an inorganic material, such as silicon nitride, silicon carbide containing hydrogen, silicon oxide, boron nitride, boron nitride containing hydrogen, cerium oxide, aluminum oxide, zirconium oxide, titanium oxide, or magnesium fluoride; an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin urea resin, acrylic resin, or photoresist resin. The alignment control layer 4 may be formed in two layers each comprising the inorganic and/or organic insulating materials described above. Alternatively, it is also possible to use a single layer of inorganic alignment control layer comprising the above-mentioned inorganic material or organic alignment control layer comprising the above-mentioned organic material. An organic alignment control layer may be formed by vapor deposition, while an organic alignment control layer may be formed by applying a solution of an organic insulating material or a precursor thereof in a concentration of 0.1 to 20 wt. %, preferably 0.2–10 wt. %, by spinner coating, dip coating, screen printing, spray coating or roller coating, followed by curing or hardening (e.g., by heating) under prescribed hardening conditions. The alignment control layer 4 may have a thickness of ordinarily 10 Å–1 μm, preferably 10–3000 Å, further preferably 10–1000 Å. The two glass substrates 2 with transparent electrodes 3 and alignment control layers 4 thereof are held to have a prescribed (but arbitrary) gap with a spacer (not shown). For example, such a cell structure with a prescribed gap may be formed by sandwiching spacers of silica beads or alumina beads having a prescribed diameter with two glass plates, and then sealing the periphery thereof with, a sealing material 5 comprising, e.g., an epoxy adhesive. Alternatively, a polymer film or glass fiber may also be used as a spacer. Between the two substrates, a liquid crystal (preferably assuming a chiral smectic phase or ferroelectricity is sealed up to provide a liquid crystal layer 1 in a thickness of generally 0.5 to 20 μm, preferably 0.5 to 5 μm. The liquid crystal may be a nematic liquid crystal or other smectic liquid crystals.

The transparent electrodes 3 are connected to the external power supply (not shown) through lead wires (not shown). Further, outside the substrates 2, polarizers 8 are applied. The device shown in FIG. 1 is used as a transmission-type liquid crystal device by employing transparent substrates (e.g., glass plates) and is provided with a light source 9.

The above-mentioned liquid crystal device may be modified into a color liquid crystal device, e.g., by forming on at least one substrate a color filter layer (uneven layer) comprising color filter segments of, e.g., red (R), green (G), blue (B) and optional white (transparent) (W) and a flattening layer covering the color filter layer in succession. In this case, the color filter layer may preferably be formed below the transparent electrodes (i.e., close to the substrate). At this time, the transparent electrode comprising the transparent film excellent in surface flatness (surface unevenness of at most 30 Å) is also effective in suppression the influence of the uneven color filter layer together with the flattening layer, thus improving an alignment state of liquid crystal molecules.

Further, in the above-mentioned liquid crystal device, it is possible to provide to one substrate a switching element (preferably a TFT) connected with a transparent electrode corresponding to pixels.

Figure 13:
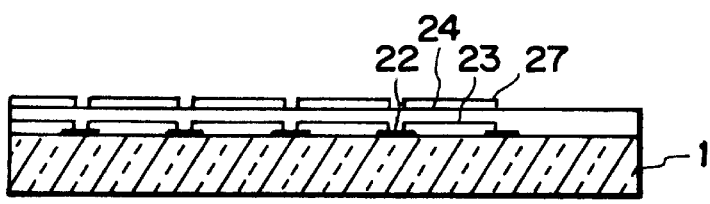
FIG. 13 is a schematic sectional view of an embodiment of a liquid crystal device used in the present invention.

FIG. 13 is a schematic sectional view of a substrate structure including a color filter layer used in a color liquid crystal device as an embodiment of the display device of the present invention.

Referring to FIG. 13, on a glass substrate 1 (one of a pair of glass substrates between which a liquid crystal is disposed), a black light-interrupting layer (black matrix) 22 and a color filter layer 23 are successively formed. Further thereon, a flattening layer 24 and a transparent electrode (ITO film) 27 are disposed in succession.

The color filter 23 comprises color pixels of red (R), green (G), blue (B) and white (W) and is actuated to effect color display according to additive process by controlled voltage application to the liquid crystal layer between the substrates. The flattening layer 24 is formed so as to cover the color filter layer 23 to ensure protection and evenness (smoothness) of the color filter layer 23. The transparent electrode 27 comprising a transparent film consisting essentially of indium oxide and/or tin oxide, preferably ITO, contains an amorphous component as described above and patterned in a desired form on the flattening layer 24. On the transparent electrode 27, an insulating layer (not shown) and an alignment control layer (not shown) are successively formed to provide a treated substrate. The other treated substrate is prepared in a similar manner except for omitting the light-interrupting layer 22, the color filter layer 23 and the flattening layer 24. These two treated substrates are applied to each other with a spacing, which is then filled with a chiral smectic liquid crystal assuming ferroelectricity (not shown) to prepare a liquid crystal device capable of effecting color display.

In the production process of the display device of the present invention, as described above, the transparent film (preferably as a display electrode) is formed as a film of a material comprising indium oxide and/or tin oxide, whereby a weak acid-type etchant, such as hydroiodic acid or oxalic acid, can be used in an etching step through a photolithographic process at the time of effecting patterning of the transparent film in a display electrode form. As a result, conventional damages (peeling, microcrack, etc.) by the use of the strong acid-type etchant can effectively be suppressed.

In the case of producing the above-described liquid crystal device, particularly a color liquid crystal device wherein a liquid crystal is sandwiched between a pair of oppositely disposed substrates at least one of which is provided with an electrode, and at least one substrate is provided with a color filter layer and a flattening layer covering the color filter layer; a transparent film comprising an indium oxide and/or tin oxide (mixture) film, preferably an ITO film, is formed on the flattening layer and then is coated with a photoresist, followed by etching with a weak acid for providing a desired electrode pattern by using a lithographic process.

In case where an ITO film is used for providing a patterned display electrode, the ITO film may preferably be a film having a low crystallinity satisfying the following relationship:

$$(1/d) \times (H1/H2) \leq 1/5,$$

wherein d denotes a thickness (μm) of the ITO film, H1 denotes a peak intensity at crystal plane (2, 2, 2) of the ITO film according to X-ray diffraction analysis and H2 denotes a peak intensity at crystal plane (1, 1, 1) of a standard (reference) silicon (Si) powder according to X-ray diffraction analysis.

The ITO film containing an amorphous component increases its amorphous degree when the peak intensity H1 at crystal plane (2, 2, 2) is lowered. However, the peak intensity H1 varies depending on an analysis sensitivity and a thickness of a sample (ITO) film. For this reason, in the present invention, the crystallinity (or amorphous degree) is standardized by using the peak intensity H2 at crystal plane (1, 1, 1) of the standard Si powder and the ITO film thickness d, thus providing the above relationship ((1/d)×(H1/H2) ≤1/5).

If the crystallinity ((1/d)×(H1/H2)) exceeds 1/5, a high-crystalline ITO component is increased, so that it is difficult to effect etching with weak acid. In other words, the value of 1/5 corresponds to an upper limit value allowing a good weak-acid etching not causing occurrence of an etching residue.

Hereinbelow, the present invention will be described more specifically with reference to examples.

In the following examples, X-ray diffraction analysis and evaluation of surface unevenness are performed in the following manner.

X-ray Diffraction Analysis

A sample ITO film is formed on a glass substrate or a silicon substrate (silicon wafer) and cut to provide a measurement sample having a size of 35 mm×50 mm.

The thus prepared measurement sample is subjected to X-ray diffraction analysis by using an X-ray diffraction apparatus ("MXP18", manufactured by MAC Co.) under the following conditions.

Target: Cu

Voltage: 50 KV

Current: 250 mA

Divergence slit: 1 deg.

Scattering slit: 1 deg.

Detection mode: 2θ rotation mode

Incident angle: θ=3 deg. (fixed)

Evaluation of Surface Unevenness

First, in order to observe a surface shape (surface state) of a sample ITO film, oblique (inclined) observation is effected by using a scanning electron microscope (SEM) ("Model S4100", mfd. by Hitachi Seisakusho K.K.) under the condition of an inclination angle of 45 degrees and an acceleration voltage of 10–30 kV. Thereafter, detailed measurement of a surface unevenness of the sample ITO film is performed by using an atomic force microscope (AFM) manufactured by Seiko Denshi K.K. with a cantilever (mfd. by Olympus K.K.).

The sample ITO film is formed on a silicon wafer which has been polished with high accuracy. This is because a glass substrate has an undulation component at its surface and accordingly is liable to invite a measurement error in the case of a longer measuring range.

Figure 3:
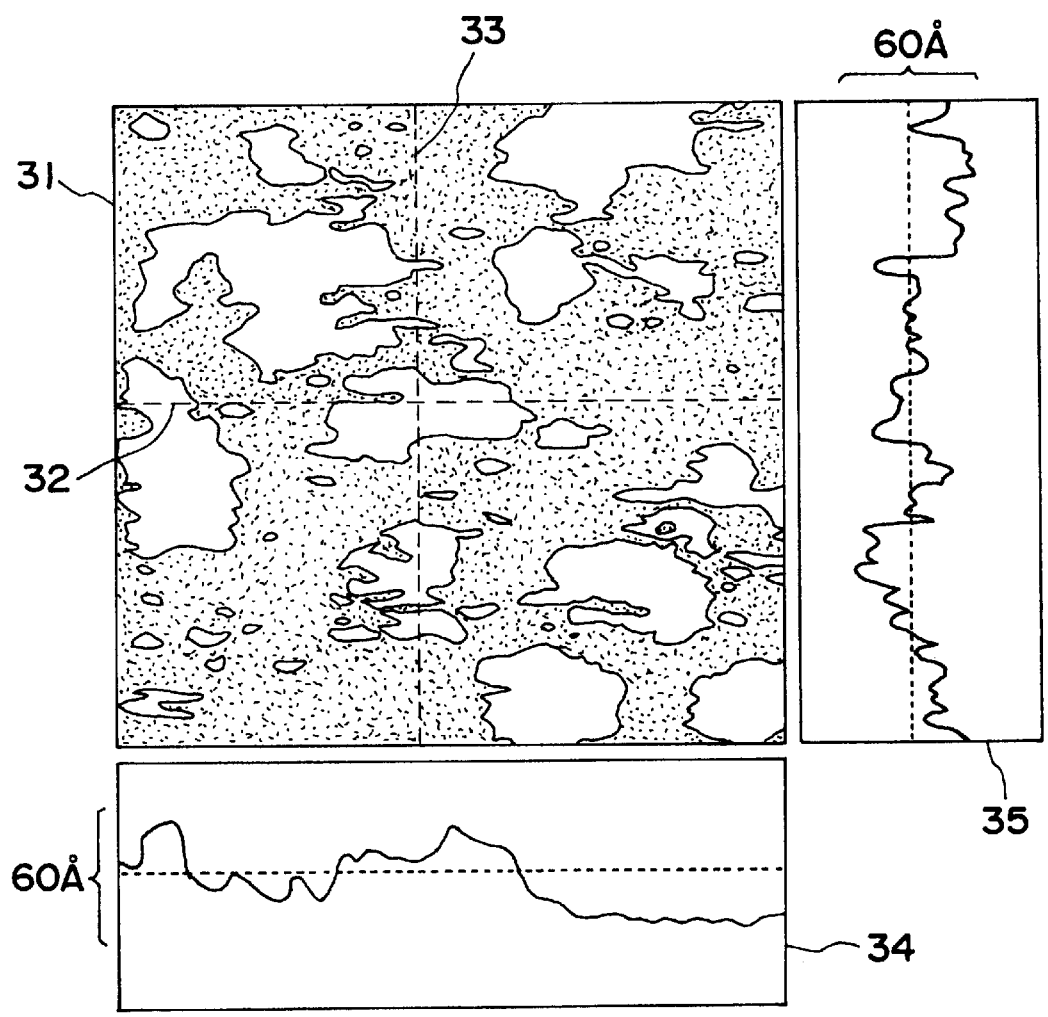
Figure 5:
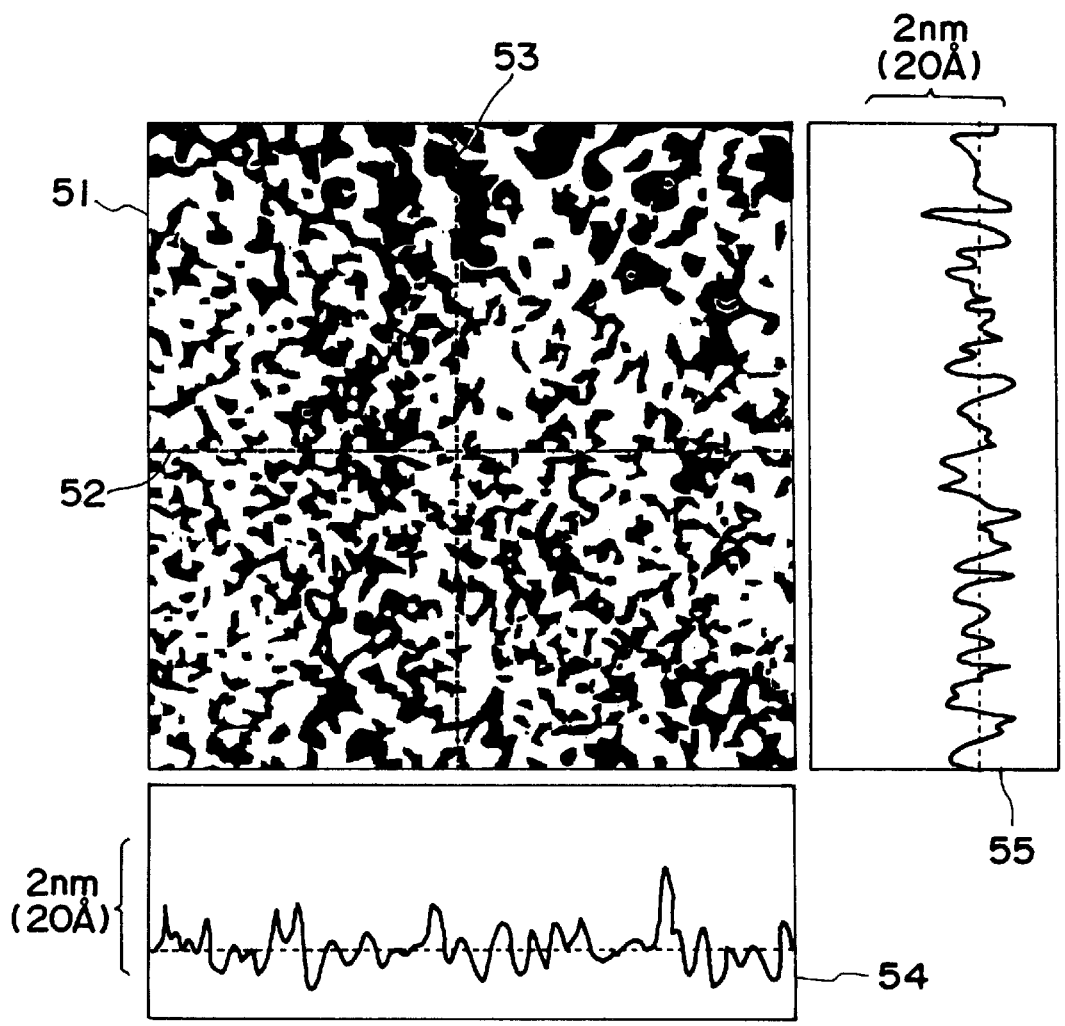

For measurement, e.g., as shown in FIGS. 3 and 5, scanning with the AFM is performed in an area (6000 Å×6000 Å) surrounding the indicated region 31 or 51 (5000 Å×5000 Å) in such a manner that a horizontal scanning is performed with respect to 256 points along a reference line 32 (or 52) in a horizontal length of 6000 Å while keeping a contact spacing between adjacent measurement points and a vertical scanning is performed similarly as in the horizontal scanning along a reference line 33 (or 53) to provide sectional shapes 34 and 35 (or 54 and 55) of the surface of an objective film. Based on these sectional shapes, a surface unevenness is determined.

EXAMPLE 1

In this example, the following three experiments were performed.

(Experiment 1)

A comparative (high-crystalline) ITO film having a thickness of 800 Å was formed on an objective substrate through an A process (conventional process) under conditions described below, and an 800 Å-thick ITO film was formed on an objective substrate through a B process including a heat treatment under conditions described below.

The A process is a conventional process for providing a minimum sheet resistance to a resultant ITO film by setting a substrate temperature at 200° C. or above and appropriately controlling a mixing ratio of oxygen gas ($O_2$)/argon gas (Ar). The B process is process for providing an ITO film containing an amorphous component by controlling a substrate temperature, e.g., at 100° C. or below.

The mixing ratio of $O_2$/Ar is charged under the influence of several factors, such as a vacuum degree and a vacuum quality within a sputtering apparatus, an oxygen content in a target, moisture, and a sputtering power density, and cannot be specified as a certain value.

The processes (A and B processes) were performed by using a sputtering apparatus ("ILC-705", mfd. by Nichiden Anelva K.K.) under the following conditions, respectively.

| Condition | A process | B process |
| --- | --- | --- |
| Target | ITO*[1] | ITO*[1] |
| Substrate temp.(° C.) | 220 | 60 |
| Sputtering pressure (mTorr) | 3 | 2 |
| $O_2$ flow (sccm) | 3 | 2 |
| Ar flow (sccm) | 200 | 200 |
| Conveyance speed (mm/min) | 300 | 300 |
| Sputtering Power (kW) | 0.75 | 0.75 |

*[1] A high-density ITO target (density: 95 %, indium oxide: 90 wt. %, tin oxide: 10 wt. %, mfd. by Mitsui Kinzoku K.K.) was used.

In the process B, a heat treatment (annealing) at 200° C. for 1 hour was performed after the above film formation.

Figure 2:
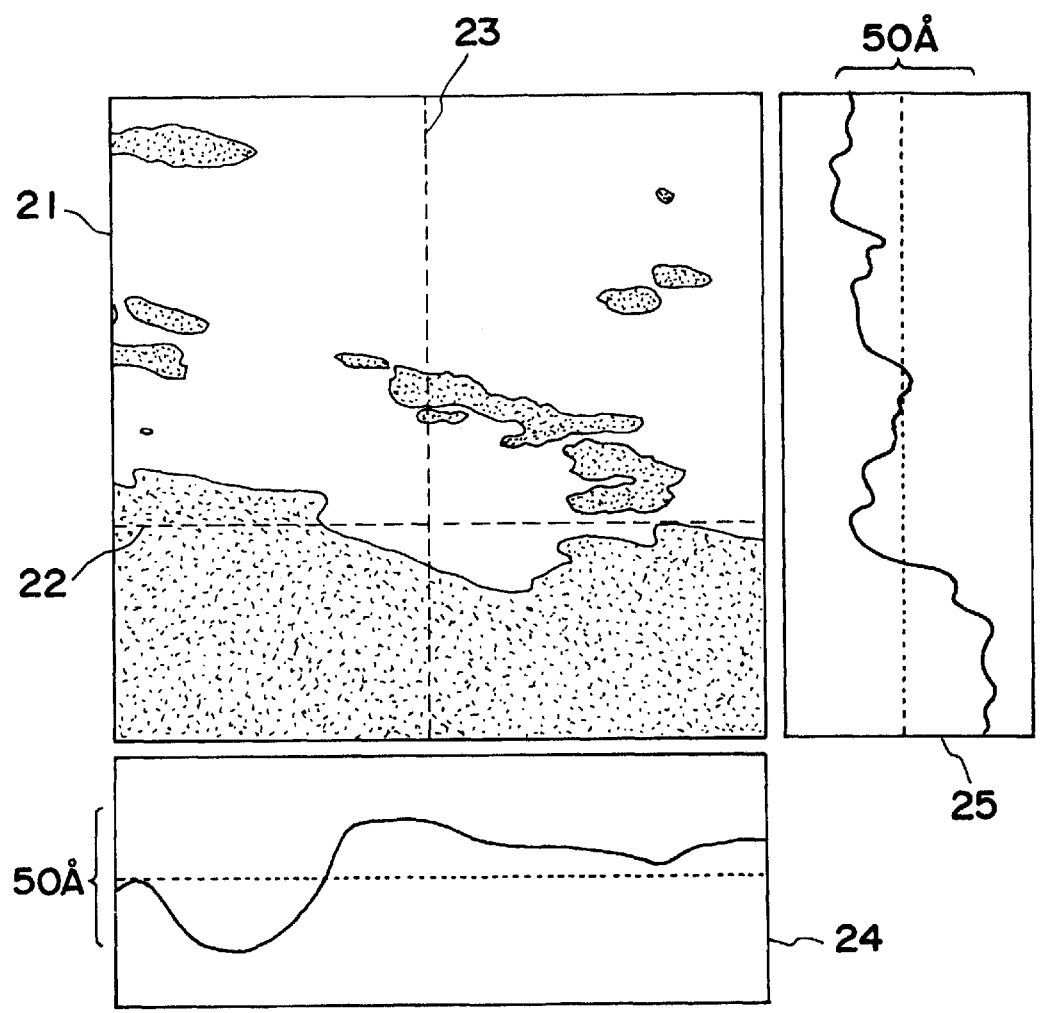
FIGS. 2–5 are respectively a sketch of an enlarged plan view of the surface of an ITO film produced through a prescribed sputtering process and corresponding two sectional views each showing a surface unevenness distribution taken along indicated dotted lines in atomic force microscope (AFM) analysis; wherein FIGS. 2 and 4 includes the sketched surface area of 500×500 Å, FIGS. 3 and 5 include the sketched surface area of 5000×5000 Å, the ITO films as to FIGS. 2 and 3 are produced through A process appearing hereinafter, and the ITO films as to FIGS. 4 and 5 are produced through B process appearing hereinafter.

As a result of the AMF observation, the ITO film formed through the A process provided a surface state and surface unevenness shown in FIGS. 2 and 3 (observation region= 500 Å×500 Å (FIG. 2), 5000 Å×5000 Å (FIG. 3)). The ITO film formed through the B process provided a surface state and surface unevenness (after the heat treatment) shown in FIGS. 4 and 5 (observation region=500 Å×500 Å (FIG. 4), 5000 Å×5000 Å (FIG. 5)).

Referring to FIGS. 2–5, reference numerals 21, 31, 41 and 51 respectively represent a surface state of an associated ITO film. Reference numerals 24, 34, 44 and 54 respectively represent a sectional shape of the ITO film taken along dotted lines 22, 32, 42 and 52, respectively, and reference numerals 25, 35, 45 and 55 respectively represents a sectional shape of the ITO film taken along dotted lines 23, 33, 43 and 53, respectively. These FIGS. 2–5 are respectively an accurate sketch though image processing by using the AFM and in the (sectional) views of the sectional shapes (24, 25, 34, 35, 44, 45, 54 and 55), a difference in height is appropriately scaled up. In the plan views of the surface states (21, 31 41 and 51), a bright (or white) portion represents a projection portion and a dark portion represents a recess portion on the basis of a reference line (dotted lines in respective sectional views).

Figure 4:
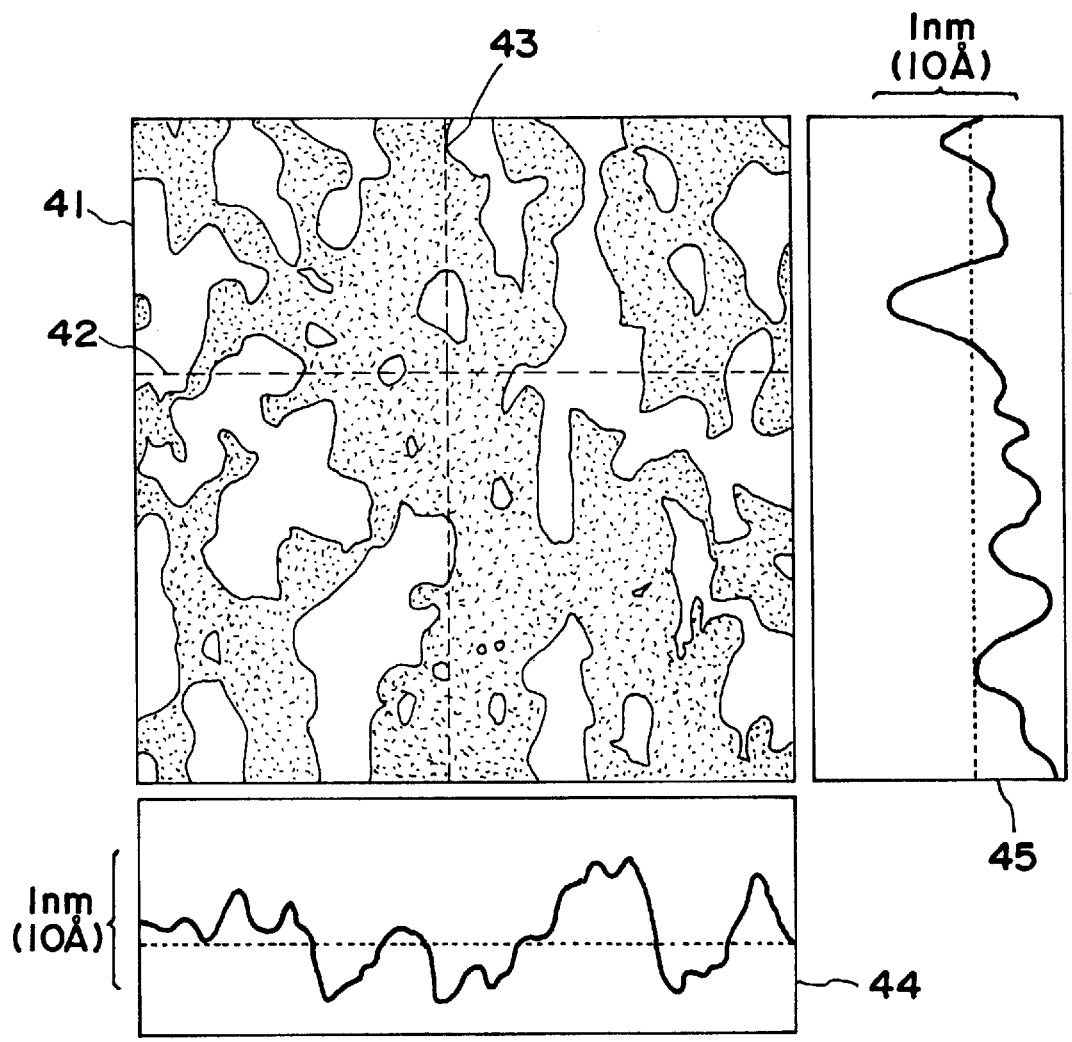

An apparent from FIGS. 4 and 5,the ITO film by the B process showed a surface unevenness (a maximum difference in height) in a horizontal length of 200–500 Å of ca. 20 Å or below. On the other hand, as shown in FIGS. 2 and 3, the ITO film by the (conventional) A process showed a surface unevenness of above 50 Å.

Figure 6:
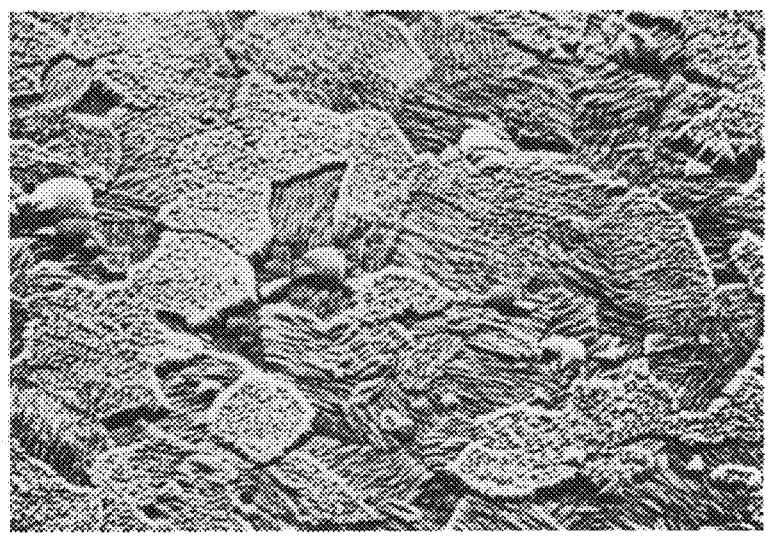
FIGS. 6, 8 and 10 are respectively a photomicrograph (×50,000) of an ITO film produced through A process (FIG. 6), B process (FIG. 8) or C process (FIG. 10).
Figure 8:
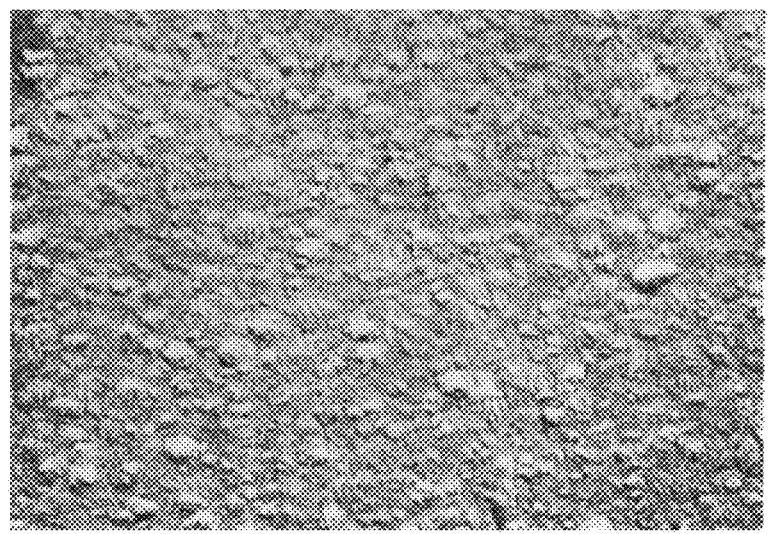
Figure 7:
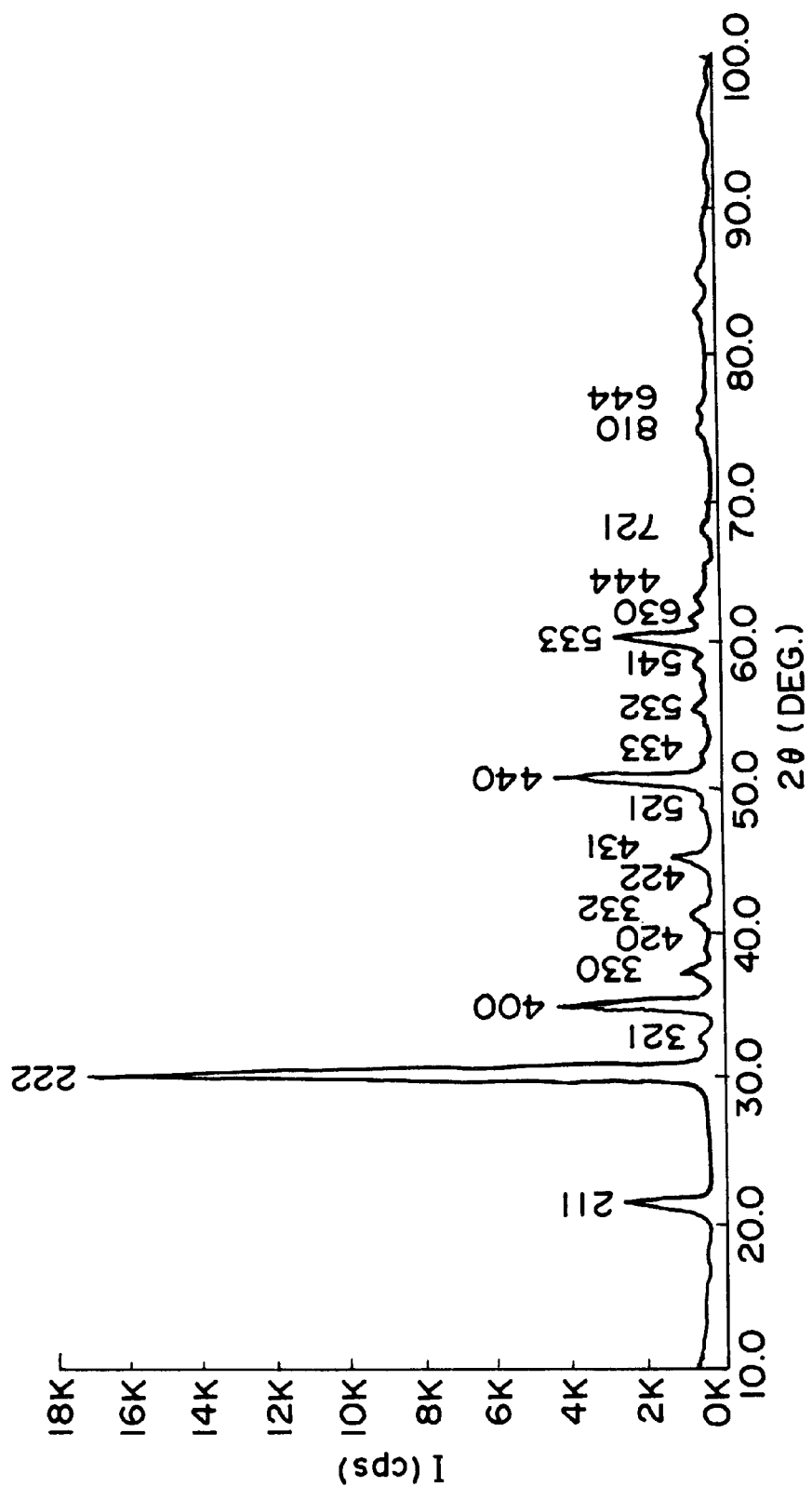
FIGS. 7, 9, and 11 are respectively an X-ray diffraction profile (chart) of an ITO film produced through A process (FIG. 7), B process (FIG. 9) or C process (FIG. 11).
Figure 9:
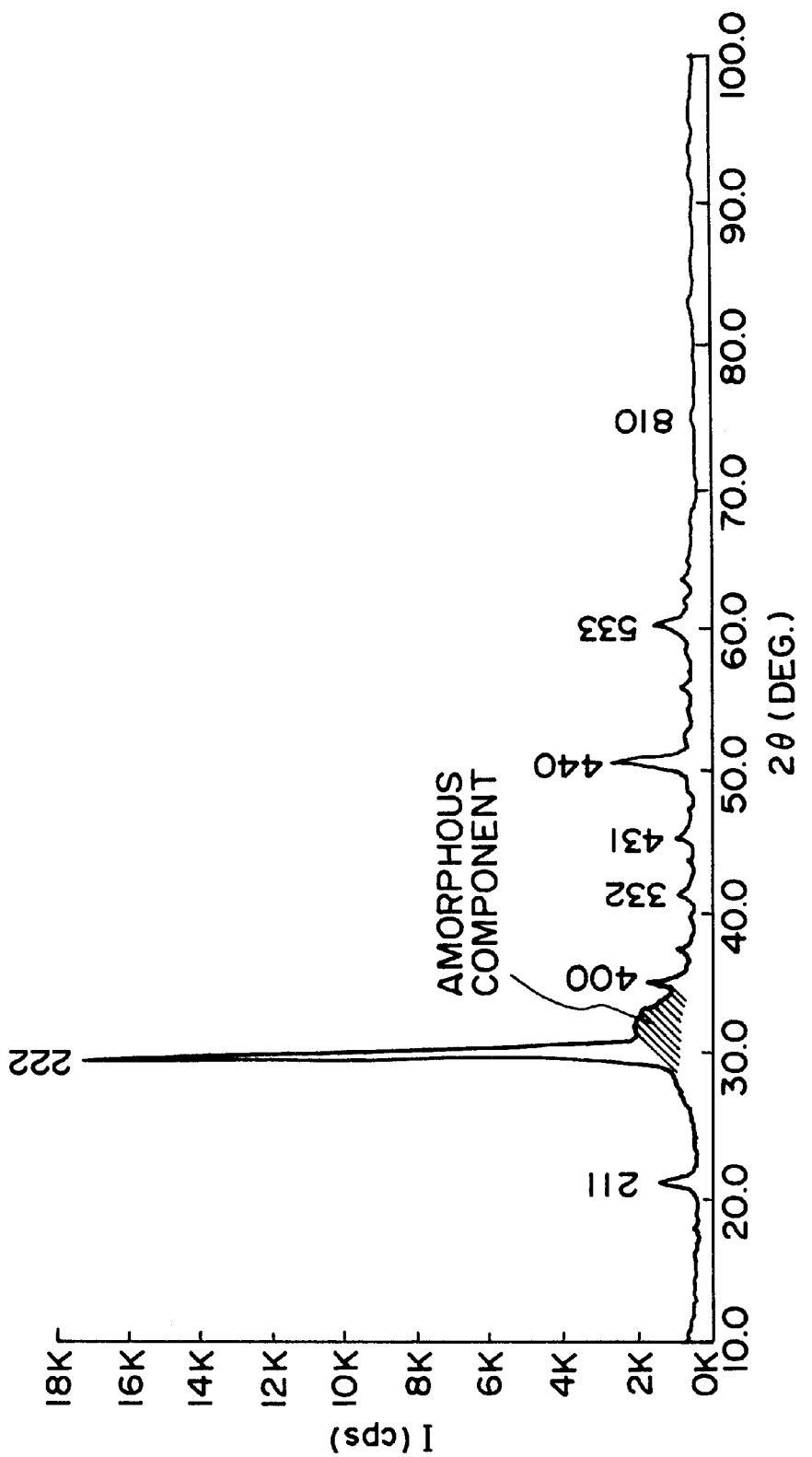

Further, the respective ITO films (by the A process and the B process) provided photomicrographs through an SEM (×50000, acceleration voltage=20 kV) shown in FIG. 6 (A process) and FIG. 8 (B process) and X-ray diffraction profiles (charts) (immediately after film formation by sputtering) shown in FIG. 7 (A process) and FIG. 9 (B process).

As apparent from FIGS. 6 and 8, the ITO film by the B process (FIG. 8) was found to be suppressed in an increase in crystal size and a surface roughening accompanied thereby and to provide a surface flatter (smoother) than the ITO film by the A process (FIG. 6).

Further, as shown in FIG. 9, the ITO film by the B process was found to contain an amorphous component (hatched portion) as identified by a shoulder (hollow peak) having an X-ray intensity of ca. 1000–2000 cps.

Accordingly, it was confirmed that the ITO film containing an amorphous component produced through the B process was effective in improving a surface flatness. When this ITO film (B process) was subjected to the annealing (200° C., 1 hour), the sheet resistance was changed from 120 ohm/cm$^2$ (before annealing) to 40 ohm/cm$^2$ and the transmittance (500 nm) was also changed from 80% (before annealing) to 89%.

As described above, a resultant liquid crystal device using the ITO film (by the B process) as excellent in surface flatness and provided a low resistance and a high transmittance through the annealing treatment. In addition, it was confirmed that before the annealing treatment it was possible to effect patterning of the ITO film by etching with weak acid. At this time, the ITO film (B process) showed an etching time being about ⅕ of that of the ITO film (A process). Further, it was also found that the ITO film (B process) allowed an acid concentration being about ½ of that of the etchant for the ITO film (A process) when an identical etching time was set.

Separately, on each of substrates which have been polished with high accuracy and provided with an aluminum wiring layer, followed by removal of the wiring layer at a central portion, an ITO film was formed through the A process. Further thereon, a 10 nm-thick polyimide alignment control layer was formed by using a polyimide precursor ("LQ-1800", mfd. by Hitachi Kasei K.K.), followed by rubbing with a nylon fiber-planted cloth. The thus prepared two substrates were applied to each other via spacer beads to provide a blank cell, which was then filled with a ferroelectric liquid crystal "ZLI4525", mfd. by Merck Co.), followed by sealing to prepare a liquid crystal cell (device) A1. In a similar manner except for changing the A process to the B process, a liquid crystal cell B1 was prepared.

The thus prepared liquid crystal cells A1 and B1 were respectively subjected to voltage application between oppositely disposed transparent electrodes to cause switching of two stable states of the ferroelectric liquid crystal and were subjected to observation of a microscopic uniformity (homogeneity) of an alignment state, whereby the liquid crystal cell A1 showed many alignment defects (due to deviation of layer normal of smectic layers), whereas the liquid crystal cell B1 showed substantially no alignment defects of a problematic level.

(Experiment 2)

An 800 Å-thick ITO film was formed on an objective substrate though a C process by using a sputtering apparatus ("ILC-3944", mfd. by Nichiden Anelva K.K.) under the following conditions.

| Target | ITO*[1] |
|---|---|
| Substrate temp. (° C.) | 25 |
| Sputtering pressure (mTorr) | 2.8 |
| O$_2$ flow (sccm) | 0.5 |
| Ar flow (sccm) | 140 |
| Conveyance speed (mm/min) | 220 |
| Sputtering Power (kW) | 1.2 |

*[1]A high-density ITO target (density: 95 %, indium oxide: 90 wt. %, tin oxide: 10 wt. %, mfd. by Mitsui Kinzoku K.K.) was used.

Figure 10:
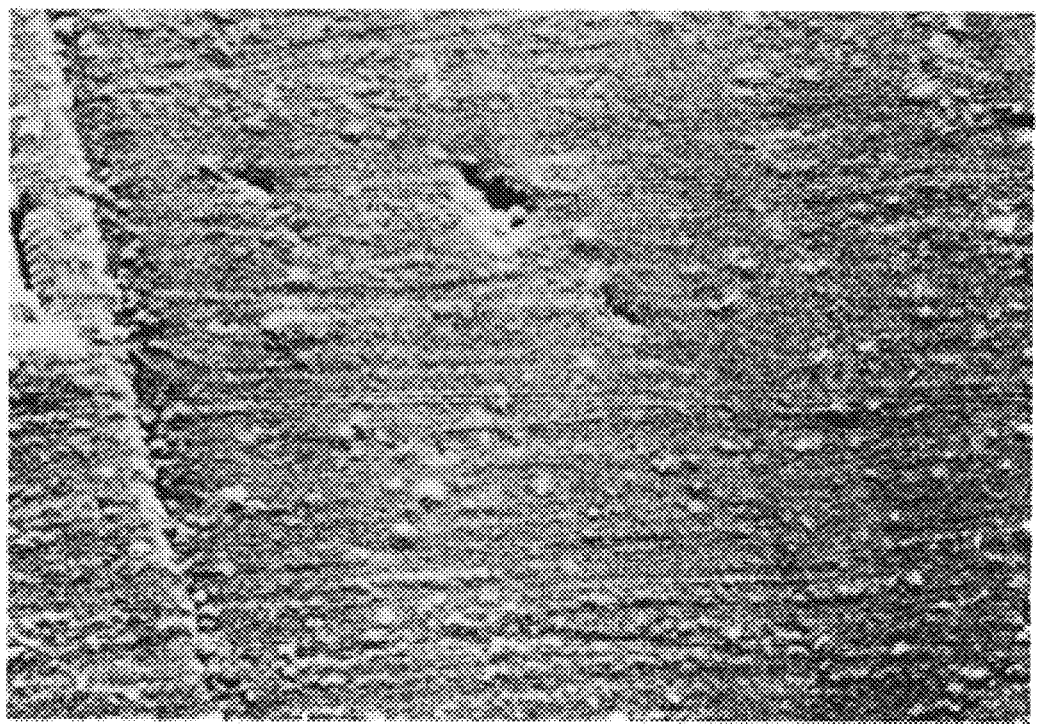
Figure 11:
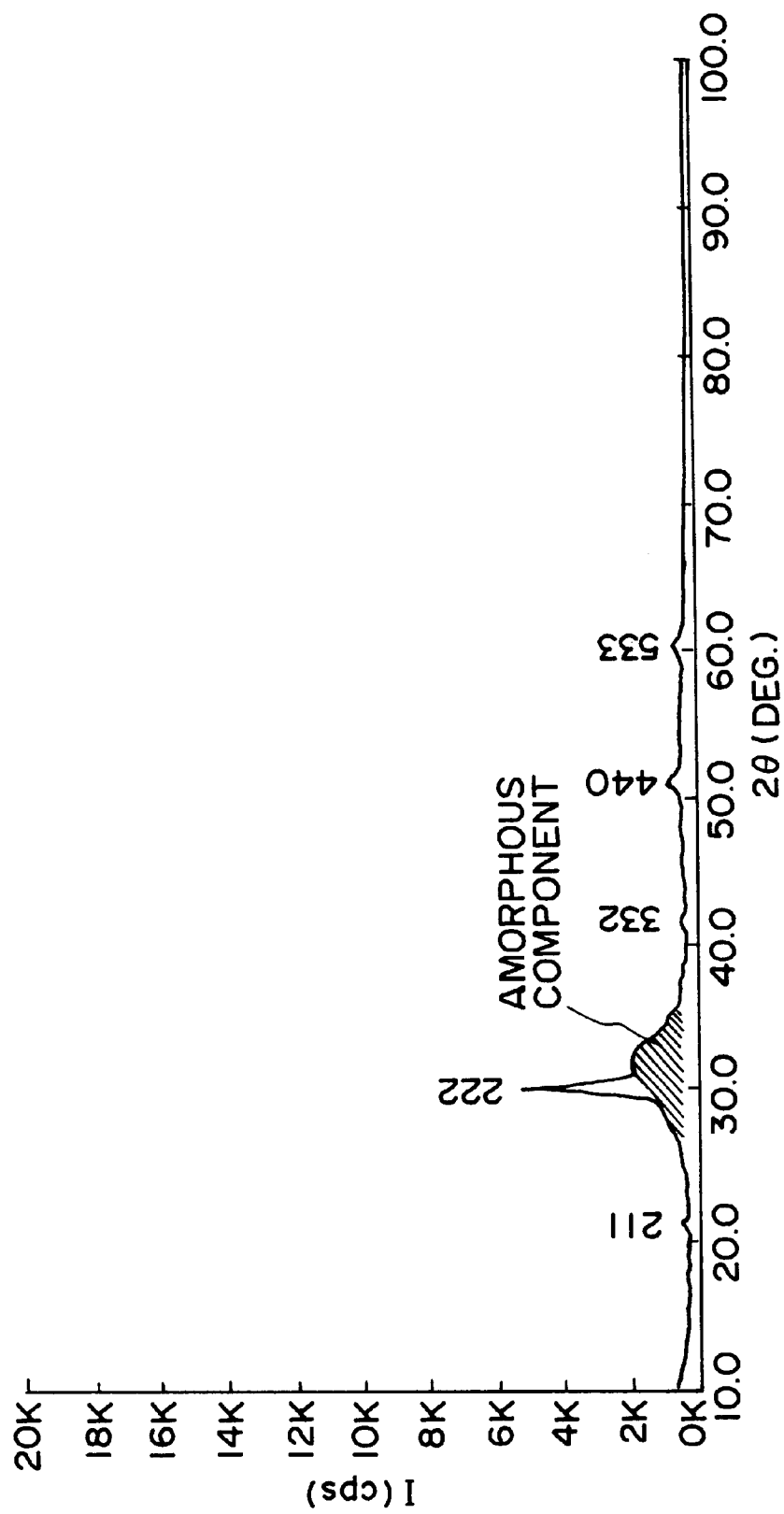

Further, the ITO film (by the C process) provided a photomicrograph through an SEM (×50000, acceleration voltage=20 kV) shown in FIG. 10 and an X-ray diffraction profile (chart) (immediately after film formation by sputtering) shown in FIG. 11.

As apparent from FIG. 10, the ITO film produced by the C process was found to provide a flattened surface.

Further, it was also found that a surface flatness could be achieved through the C process by effectively suppressing a growth in crystal particle size due to an amorphous component providing minute particles. The ITO film by the C process was further decreased in a crystal component compared with the ITO film by the B process (Experiment 1), thus further improving a surface flatness.

Three liquid crystal devices A, B and C were respectively prepared by using a pairs of substrates provided with ITO films produced through the processes A, B and C (for divides A, B and C respectively), in the following manner.

On each of the ITO films, a 50 Å-thick polyimide alignment control film obtained from a polyimide precursor ("LQ1800", mfd. by Hitachi Kasei K.K.) was formed and rubbed with a nylon fiber-planted cloth. The thus prepared two substrates were applied to each other via spacer beads to prepare a blank cell, which was then filled with a ferroelectric liquid crystal containing an optically active compound having a fluorinated chiral portion, followed by sealing to provide an objective liquid crystal cell (device).

When the thus prepared liquid crystal devices A, B and C were subjected to observation of an alignment state, alignment defects were found to be decreased in the order of the device C (fewer defects)<the device B<the device A (many defects).

According to this experiment, it was confirmed that the ITO films containing an amorphous component (produced through the B and C processes) excellent in surface flatness were effective in suppressing or minimizing the alignment defects (Experiment 3)

One substrate having plural layers thereon was prepared using the C process adopted in Experiment 2 and forming the indicated layers (structural members) shown below on a glass substrate in the following manner.

Glass substrate (polished with high accuracy): 1.1 mm

Light-interrupting layer (black matrix): 1000 Å

Color filter layer: 1.5 μm

Polymeric flattening layer: 1.5 μm

ITO film: 800 Å

Metal wiring layer: 2000 Å

Insulating layer (TaO): 900 Å

Alignment control film ("LQ 1800" used): 100 Å

The other substrate was prepared in the same manner as in the above substrate except for omitting the color filter layer and the polymeric flattering layer.

These substrates were applied to each other via spacer beads to form a blank cell, which was then filled with a ferroelectric liquid crystal containing an optically active compound having a fluorinated chiral part, followed by sealing to prepare a liquid crystal ("panel 1").

In a similar manner, a liquid crystal device ("panel 2") was prepared by using 800 Å-thick ITO films produced through the B process (used in Experiment 1).

When the panels 1 and 2 were respectively subjected to observation of an alignment state by applying a voltage to the transparent electrodes (ITO films) to cause switching of two stable states, the panel 2 was found to provide fewer alignment defects than the panel 1.

Incidentally, in this experiment, the ITO film after produced through the C process rich in etching performance was subjected to patterning by a photographic process, followed by annealing at 200° C. for 1 hour to increase its transmittance (500 nm) of from 82% to 89% and decrease its sheet resistance of from 90 ohm/cm$^2$ to 30 ohm/cm$^2$, thus resulting in a suitable transparent electrode.

Further, with respect to the crystallinity (or amorphous degree), as described hereinabove, a value of a peak intensity of standard Si powder in X-ray diffraction analysis is adopted as a reference peak intensity (H2) in the present invention in order to provide evaluation of the crystallinity with universality.

Figure 12:
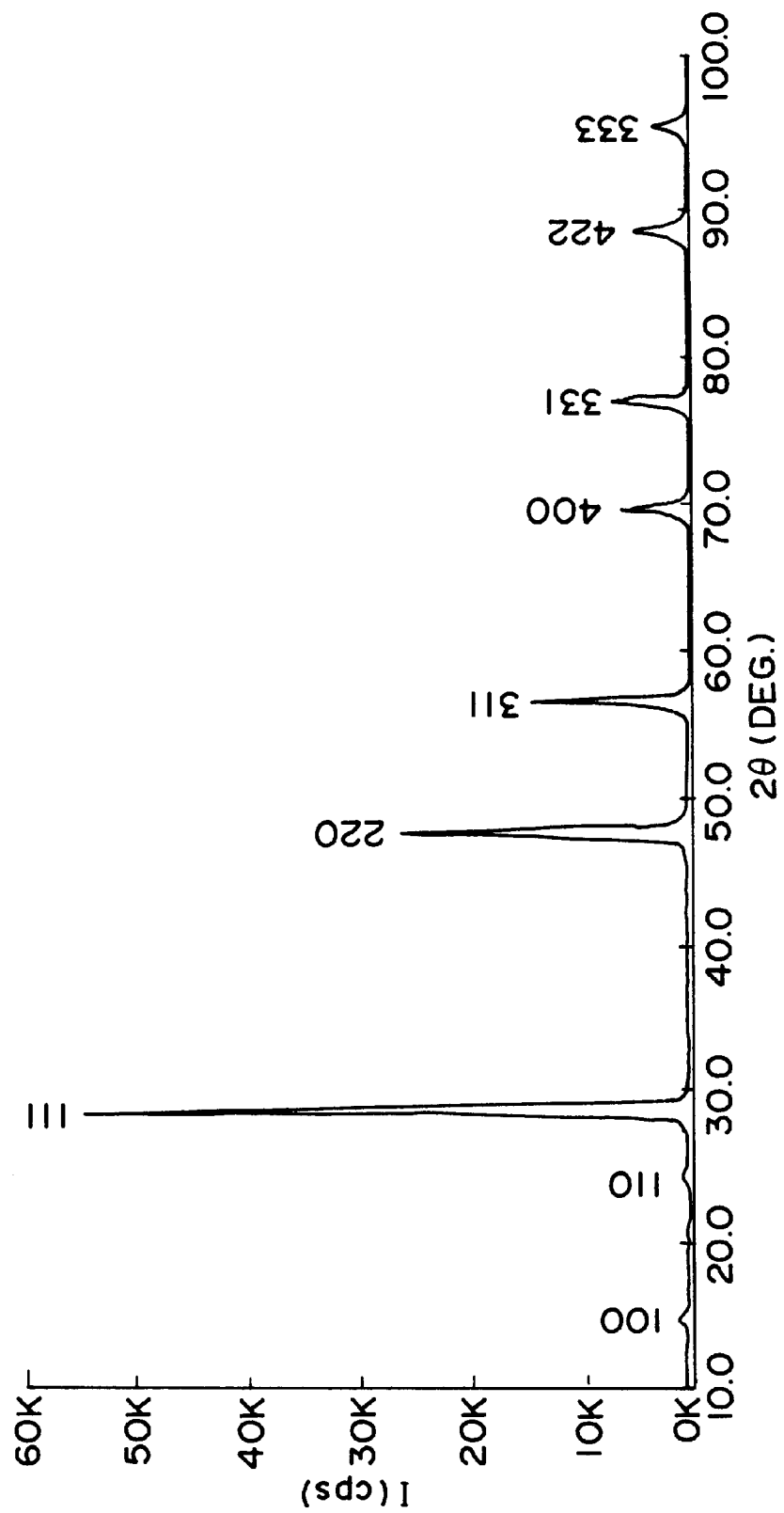
FIG. 12 is an X-ray diffraction profile (chart) of a standard silicon (Si) powder as a reference substance for evaluation of crystallinity.

FIG. 12 is an X-ray diffraction profile of the standard Si powder showing a peak intensity of about 55000 cps at a 2θ angle of about 30 degrees (for crystal plane (1, 1, 1)). A crystal component of an ITO film generally shows a peak intensity of about 17000 to about 17500 at crystal plane (2, 2, 2) as shown in FIG. 7 (A process). The ITO film containing an amorphous component prepared by the C process provided a peak intensity of about at most 5500 cps (representing crystal peak intensity) including a hollow (shoulder) peak intensity of about 1000–2000 cps (representing amorphous component) as shown in FIG. 11.

Incidentally, the ITO crystal peak intensity is increased in proportion to an increase in thickness (of ITO film) up to about 1000 nm and is saturated when the thickness of the ITO film exceeds about 1000 nm. In this example (Experiments 1–3), the thickness of the ITO films were below 100 nm.

EXAMPLE 2

In this example, a production process of a display device comprising a transparent film as a display electrode and a color filter layer is explained with reference to FIGS. 14A–14E.

Figure 14A:
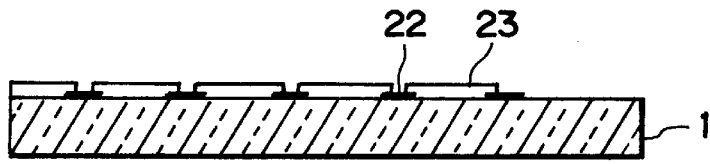
FIGS. 14A–14E are schematic sectional views for illustrating a process for producing a liquid crystal device according to the present invention.

Referring to FIG. 14A, a 1.1 mm-thick glass substrate 1 was coated with a 1000 Å-thick metal (Mo) film by sputtering and subjected to patterning by a photolithographic process to form a light-interrupting layer (black matrix) 22. Further thereon, photosensitive colored resin were applied and subjected to patterning by a photolithographic process to form a ca. 1.5 μm-thick color filter layer 23 comprising color pixel segments of red (R), green (G), blue (B) and white (W), respectively.

Figure 14B:
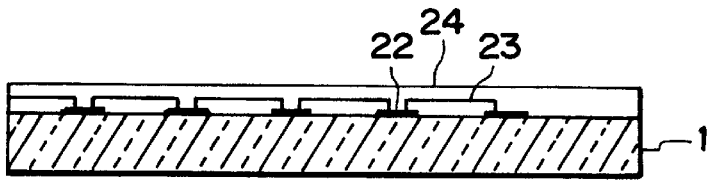

On the color filter layer 23, a ca. 1.5 μm-thick flattening layer 24 comprising polyvinylsiloxane was formed by spin coating (FIG. 14B).

Figure 14C:
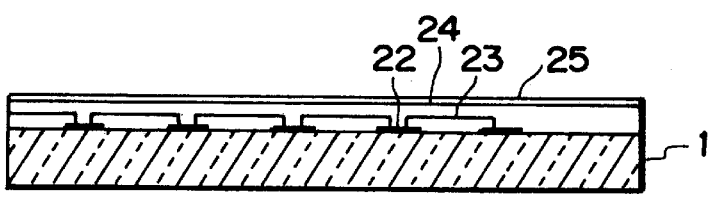

Further thereon, a ca. 700 Å-thick ITO film 25 containing an amorphous component was formed by sputtering under the following conditions (FIG. 14C).

Apparatus: "ILC-705", mfd. by Nichiden Anelva K.K.

Target: High-density ITO target (density=90%, indium oxide=90 wt. %, tin oxide=10 wt. %, mfd. by Mitsui Kinzoku K.K.)

Substrate temp.: 30° C.

Sputtering pressure: 3 mTorr $O_2$ flow: 3 sccm

Ar flow: 200 sccm

Conveyance speed: 500 mm/min

Sputtering power: 0.57 kW

Figure 14D:
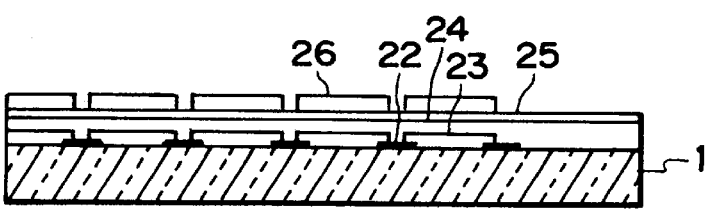

Then, on the ITO film 25, a ca. 2 μm-thick photoresist pattern 26 was formed by applying thereon a photoresist and effecting a photolithographic process including an exposure step and a development step (FIG. 14D).

Figure 14E:
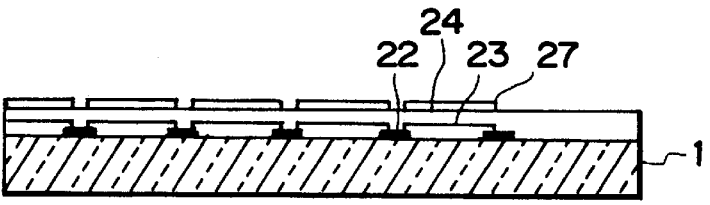
Figure 15:
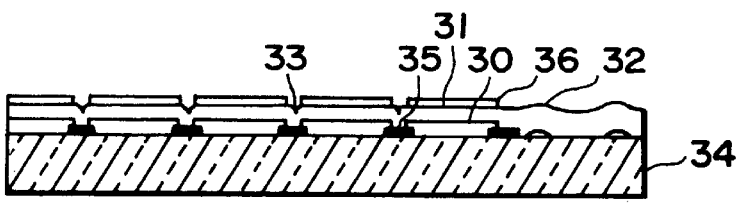
FIG. 15 is a schematic view of an embodiment of a liquid crystal device produced through a conventional production process.

The ITO film 25 having thereon the photoresist pattern 26 was etched with a weak acid-type etchant, followed by removal of the resist pattern 26 to form a patterned ITO film (transparent electrode) 27 (FIG. 14E). The etchant comprised a diluted hydroiodic acid in a dilution ratio of HI (57 wt. % content):$H_2O$ (water)=50:50. In the present invention, the dilution-ratio may preferably be 60:40 to 10:90. The etchant also showed a pH=−1.0 as obtained by the above-described method. In the present invention, the thus determined pH value may preferably be above −1.1, more preferably above −1.0. The etchant further showed an etching rate of 5 Å/sec (which may more preferably be in a range of 10–30 Å/sec) at a liquid temperature of 25° C. and did not contain chlorine ion and bromine ion being liable to pass through the resinous flattening layer 24.

In this example, the etching of the ITO film 25 was performed for a prescribed time being long two times a suitable etching time, i.e., over-etching was performed. However, the ITO film 25 merely showed an amount of etching at sides thereof (side etching amount) of about at most 1 μm based on a spacing between adjacent pixels (photoresist portions) of about 10 μm.

Herein, the side etching amount is determined as follows. When an etching is effected by using a photoresist having a pattern with a spacing between adjacent photoresist portions of about 10 μm (corr. to a pixel spacing), corresponding adjacent ITO film portions after the etching provide a spacing therebetween of about at most 11 μm. At this time, the side etching amount is about at most 1 μm.

Then, on the transparent electrode (patterned ITO film) 27, an insulating film (not shown) an an alignment control film (not shown) are successively formed to provide one treated substrate.

The other treated substrate is prepared in the same manner as in the above treated substrate except that the color filter layer 23 and the flattening layer 24 are not formed.

Into a spacing with a spacer between the treated substrates oppositely applied to each other, a liquid crystal (e.g., a nematic liquid crystal, a smectic liquid crystal, a chiral smectic liquid crystal, particularly a ferroelectric liquid crystal, etc.) is filled to prepare a liquid crystal device capable of effecting color display. Further, properties of the patterned ITO film 27 (e.g., sheet resistance, optical transmittance) can be improved by heat treatment including annealing in the steps of the device production process subsequent to the patterning step thereof, e.g., by heat treatment in the step of forming an alignment control film.

As described above, according to this example, the ITO film 25 containing an amorphous component could be formed by decreasing the substrate temperature, the sputtering pressure (high vacuum state) and the $O_2$ flow. In addition, by employing the appropriately diluted hydroiodic acid as an etchant, it was possible to suppress a reaction with a trace metal component contained in the flattening layer 24, thus preventing occurrences of peeling of the flattening layer 24 and a microcrack therein. Further, the ITO film 25 containing an amorphous component has a surface smoother than the high-crystalline ITO film, thus being excellent in surface evenness and not adversely affecting a flatness of an upper alignment control layer controlling an alignment state of liquid crystal molecules. As a result, a resultant liquid crystal device (as a final product) is excellent in liquid crystal-aligning control performance.

EXAMPLE 3

In this example, another embodiment of a production process of a display device comprising a transparent film as a display electrode and a color filter layer is explained with reference to FIGS. 14A–14E.

A 1000 Å-thick black matrix 22, a ca. 1.5 μm-thick color filter layer 23 and a ca. 1.5 μm-thick flattening layer were successively formed on a 1.1 mm-thick glass substrate 1 in the same manner as in Example 2 (FIGS. 14A and 14B).

On the flattening layer 24, a ca. 700 Å-thick ITO film 25 containing an amorphous component was formed by sputtering under the following conditions (FIG. 14C).

Apparatus: "ILC-705", mfd. by Nichiden Anelva K.K.

Target: High-density ITO target (density=90%, indium oxide=90 wt. %, tin oxide=10 wt. %, mfd. by Mitsui Kinzoku K.K.)

Substrate temp.: 30° C.

Sputtering pressure: 2 mTorr $O_2$ flow: 2 sccm

Ar flow: 200 sccm

Conveyance speed: 500 mm/min

Sputtering power: 0.75 kW

The thus prepared ITO film was subjected to X-ray diffraction analysis, whereby it was found to satisfy the relationship: $(1/d)\times(H1/H2)\leq 1/5$, thus confirming a low crystallinity.

Then, on the ITO film 25, a ca. 2 μm-thick photoresist pattern 26 was formed by applying thereon a photoresist and effecting a photolithographic process including an exposure step and a development step (FIG. 14D).

The ITO film 25 having thereon the photoresist pattern 26 was etched with a weak acid-type etchant, followed by removal of the resist pattern 26 to form a patterned ITO film (transparent electrode) 27 (FIG. 14E). The etchant comprised a diluted hydroiodic acid in a dilution ratio of HI (57 wt. % content):$H_2O$ (water)=50:50. The diluted etchant also showed a pH=−1.0 as obtained by the etchant further showed an etching rate of 10 Å/sec at a liquid temperature of 25° C.

Similarly as in Example 2, the resultant (patterned) ITO film prepared in this example showed a side etching amount of at most 1 μm and did not cause occurrences of peeling of the flattening layer 24 and microcracks therein because of the use of the appropriately diluted hydroiodic acid (etchant). The use of the appropriately diluted hydroiodic acid contributed to cost saving of production costs of the device since available hydroiodic acid was expensive.

It was also possible to effect etching with a 17 wt. %-oxalic acid aqueous solution (providing a pH of −0.2) at an etching rate of 8–11 Å/sec and a liquid temperature of 45° C., whereby a side etching amount of about 1 μm was confirmed.

Thereafter, a color liquid crystal device was prepared by using the above-patterned iTO film 27 otherwise in the same manner as in Example 2. In this case, the patterned ITO film 27 may preferably be subjected to appropriate annealing, as desired.

As described hereinabove, according to the present invention, by using a transparent film comprising a material comprising indium oxide-tin oxide, particularly an ITO film as a display electrode, it is possible to attain a surface flatness and maintain a transmittance and a sheet resistance through annealing, as desired, thus realizing a display device exhibiting excellent display characteristics.

Further, in the present invention, patterning of an ITO film containing an amorphous component formed on a substrate constituting a display device (liquid crystal device) can be performed by applying thereto a photoresist and subjecting it to etching with a weak acid-type etchant, so that the weak acid-type etchant does not adversely affects (damages) its underlying layers, such as a flattening layer and a color filter layer in the case of a color liquid crystal device. As a result, it is possible to suppress a peeling of the flattening layer and an occurrence of microcracks, thus improving a yield of a resultant display device.

What is claimed is:

1. A process for producing a display device comprising a substrate having thereon a display electrode comprising an indium oxide and/or tin oxide electroconductive transparent film, comprising the steps of:

forming on a substrate a film comprising indium oxide and/or tin oxide, said film containing an amorphous component and being formed by sputtering while keeping the temperature of the substrate at 100° C. or below;

patterning said film comprising indium oxide and/or tin oxide containing amorphous component by etching using a weak-acid type etchant; and annealing the patterned film while keeping the temperature of 150–300° C.

2. A process according to claim 1, wherein said weak acid-type etchant comprises oxalic acid.

3. A process according to claim 1, comprising the steps of:

forming a color filter layer having a color filter pattern on at least one of the substrates, forming a flattening layer on the color filter layer, forming said film comprising indium oxide and/or tin oxide containing an amorphous component on the flattening layer, and providing at least one of said display electrodes with a pattern corresponding to the color filter pattern through a photolithographic process including an etching treatment with a weak acid-type etchant.

4. A process according to claim 1, wherein said film comprises a indium tin oxide film.

5. A process according to claim 4, wherein said indium tin oxide film has a crystallinity satisfying the following relationship:

$$(1/d)\times(H1/H2)\leq 1/5,$$

wherein d denotes a thickness of the indium tin oxide film, H1 denotes a peak intensity at crystal plane (2, 2, 2) of the indium tin oxide film as measured by X-ray diffraction analysis, and H2 denotes a peak intensity at crystal plane (1, 1, 1) of a standard silicon powder as measured by X-ray diffraction analysis.

6. A process according to claim 1, wherein said film comprises an indium tin oxide film.

7. A process according to claim 6, wherein the color filter pattern is formed through a photolithographic process.

8. A process according to claim 1, wherein said weak acid-type etchant comprises diluted hydriodic acid showing a pH of −1.0.

9. A process for producing a display device according to claim 1, wherein said display device further comprises a liquid crystal disposed between the substrates.

10. A process according to claim 9, wherein said liquid crystal assumes a chiral smectic phase.

11. A process according to claim 9, comprising the steps of:

forming a color filter layer having a color filter pattern on at least one of the substrates, forming a flattening layer on the color filter layer, forming said a film comprising indium oxide and/or tin oxide containing an amorphous component on the flattening layer, and providing at least one of said display electrodes with a pattern corresponding to the color filter pattern through a photolithographic process including an etching treatment with a weak acid-type etchant.

12. A process for producing a display device according to claim 1, wherein said electroconductive transparent film is formed by annealing a film comprising indium oxide and/or tin oxide containing an amorphous component.

* * * * *

UNITED STATES PATENT AND TRADEMARK OFFICE
CERTIFICATE OF CORRECTION

PATENT NO. : 6,310,674 B1
DATED : October 30, 2001
INVENTOR(S) : Yoshiaki Suzuki et al.

It is certified that error appears in the above-identified patent and that said Letters Patent is hereby corrected as shown below:

Title page,
Item [54], Title, "METHOD OF MAKING A" should be deleted; and "CHARACTERISTICS" should read -- CHARACTERISTICS AND METHOD OF MAKING THE SAME --.

Item [56], References Cited, insert:
    2-251990    10/1990    (JP) --;
    1-259320    10/1989    (JP) --;
    5-173154    7/1993    (JP) --;
    7-84271    3/1995    (JP) --; and
    8-15718    1/1996    (JP) --.

Item [74], insert:
-- [74] *Attorney, Agent, or Firm* - Fitzpatrick, Cella, Harper & Scinto --.

Column 1,
Line 6, "device" should read -- devices --; and
Line 43, "in" should be deleted.

Column 2,
Line 5, "to" should be deleted;
Lines 14 and 36, "ununiform" should read -- nonuniform --;
Line 56, "etchant" should read -- etchants --; and
Line 61, "-1.09" should read -- -1.09) --.

Column 4,
Line 4, "includes" should read -- include --;
Line 12, "or" should read -- and --; and
Line 15, "or" should read -- and --.

Column 5,
Line 28, "may" should read -- may be --.

Column 6,
Line 25, "a" (first occurrence) should be deleted;
Line 51, "aligning" should read -- align --; and
Line 61, "resin" (second occurrence) should read -- resin, --.

UNITED STATES PATENT AND TRADEMARK OFFICE
CERTIFICATE OF CORRECTION

PATENT NO. : 6,310,674 B1
DATED : October 30, 2001
INVENTOR(S) : Yoshiaki Suzuki et al.

It is certified that error appears in the above-identified patent and that said Letters Patent is hereby corrected as shown below:

Column 7,
Line 18, "with," should read -- with --;
Line 22, "ferroelectricity" should read -- ferroelectricity) --; and
Line 43, "the" should read -- of the --.

Column 10,
Line 44, "An" should read -- As --; and
"5,the" should read -- 5, the --.

Column 11,
Line 7, "as" should read -- is --; and
Line 30, "Al." should read -- A1. --.

Column 12,
Line 7, "a" should be deleted; and
"divides" should read -- devices --;
Line 28, "defects" should read -- defects. --; and
Line 59, "after should read -- after being --.

Column 13,
Line 20, "thickness" should read -- thicknesses --; and
Line 32, "resin" should read -- resins --.

Column 14,
Line 8, "long" should be deleted; and
Line 22, "an an" should read -- and an --.

Column 15,
Line 42, "iTO" should read -- ITO --; and
Line 57, "affects (damages)" should read -- affect (damage) --.

UNITED STATES PATENT AND TRADEMARK OFFICE
CERTIFICATE OF CORRECTION

PATENT NO. : 6,310,674 B1
DATED : October 30, 2001
INVENTOR(S) : Yoshiaki Suzuki et al.

It is certified that error appears in the above-identified patent and that said Letters Patent is hereby corrected as shown below:

<u>Column 16,</u>
Line 7, "weak-acid type" should read -- weak acid-type --;
Line 25, "a" should read -- an --;
Line 37, "claim 1, wherein said film" should read -- claim 3, wherein the flattening layer is formed by spin coating. --;
Line 38, should be deleted; and
Line 54, "a" should be deleted.

Signed and Sealed this

Eighteenth Day of June, 2002

*Attest:*

*Attesting Officer*

JAMES E. ROGAN
*Director of the United States Patent and Trademark Office*